United States Patent [19]
Hunt

[11] 4,409,592
[45] Oct. 11, 1983

[54] MULTIPOINT PACKET DATA COMMUNICATION SYSTEM USING RANDOM ACCESS AND COLLISION DETECTION TECHNIQUES

[76] Inventor: V. Bruce Hunt, 2070-B Liberty Park Ave., Menlo Park, Calif. 94025

[21] Appl. No.: 255,448

[22] Filed: Apr. 20, 1981

[51] Int. Cl.³ ............................................. H04Q 9/00
[52] U.S. Cl. ................................. 340/825.5; 370/94; 178/3
[58] Field of Search .......................... 340/825.5; 178/3; 370/94, 92, 85

[56] References Cited

U.S. PATENT DOCUMENTS

| | | | |
|---|---|---|---|
| 3,878,512 | 4/1975 | Kobayashi et al. | 340/168 R |
| 4,259,663 | 3/1981 | Gable | 340/825.5 |
| 4,281,380 | 7/1981 | DeMesa et al. | 340/825.5 |
| 4,292,623 | 9/1981 | Eswaran et al. | 340/825.5 |
| 4,332,027 | 5/1982 | Malcolm et al. | 370/94 |

OTHER PUBLICATIONS

"Aloha Packet System With and Without Slots and Capture", Lawrence G. Roberts ARPA Network Information Center, Stanford Research Institute, Jun. 26, 1972, pp. 1-13.

"The Aloha System", Norman Abramson, *Fall Joint Computer Conference,* AFIPS Conference Proceedings, 1970, pp. 281-285, vol. 37.

"Ethernet: Distributed Packet Switching for Local Computer Networks", R. M. Metcalfe, et al., *Computer Systems,* Communications of the ACM, Jul. 1976, vol. 19, No. 7, pp. 395-404.

"Random Access Techniques for Data Transmission over Packet Switched Radio Networks," F. A. Tobagi, Ph.D. Dissertation, Dec. 1974, School of Engineering and Applied Science, University of California, Los Angeles, Calif., 90024, pp. 1-283.

*Primary Examiner*—Donald J. Yusko
*Attorney, Agent, or Firm*—Warren M. Becker

[57] ABSTRACT

In a data communications systems having a communications channel (3) for interconnecting a plurality of transceivers (1) and (2), each of said transceivers (1) and (2) including means (80) for transmitting a signal having transitions, there is provided a means (20) responsive to the presence and absence of a signal on said communications channel (3) during a transition of a signal transmitted by said transmitting means (80) for providing a collision detected (CD) signal if there is destructive interference with the transmitted signal on said communication channel (3) during a transition of said transmitted signal and means (48) responsive to said CD signal for terminating said transmitting of said signal. In the event the channel (3) is busy prior to a transmission from the transmitter (80) there is provided a carrier sense circuit (14) for indicating the channel is busy and a non-persistent control circuit (45) and a random number generator (90a) and a delay circuit (90b) responsive to the carrier sense circuit (14) and the collision detector circuit (20) for interrupting and delaying the transmitting of each of the transceivers (1) and (2) for a random period of time.

13 Claims, 7 Drawing Figures

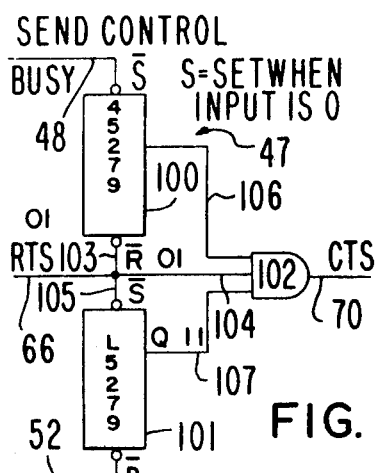
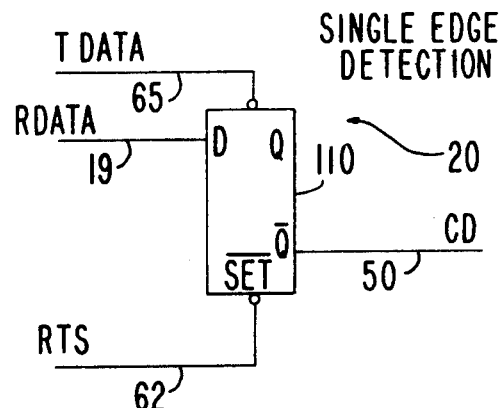
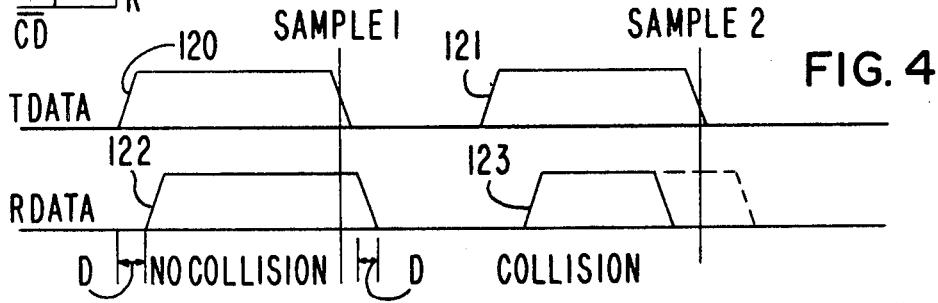
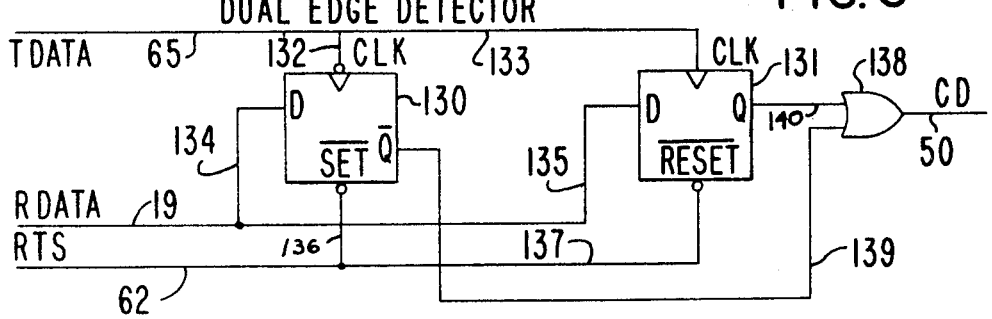
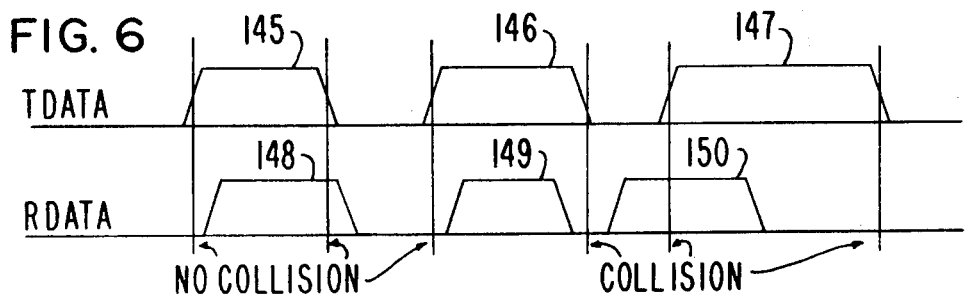

MULTIPOINT PACKET DATA COMMUNICATION SYSTEM USING RANDOM ACCESS AND COLLISION DETECTION TECHNIQUES

BACKGROUND OF THE INVENTION

The present invention relates to multipoint packet data communication systems using random access techniques in general and in particular to such systems employing collision detection techniques and carrier sense multiple access (CSMA) protocol techniques.

DESCRIPTION OF THE PRIOR ART

Many multipoint packet data communication systems have been proposed for transmitting packets between communicating devices using a single communication channel. A packet is generally defined as a fixed length message containing the address of an intended device and data. To improve the efficiency of such systems, techniques for the sharing of the single communication channel among competing stations have been introduced. Among the techniques introduced there are several called random access techniques which permit stations access to a channel whenever required, and resolve conflicts in channel usage by using random numbers. The random numbers are used when a conflict occurs to specify a period of time each conflicting station must wait before an attempt is made to gain access to the channel.

The Aloha System

The first random access technique introduced for multipoint packet data communication was the ALOHA system (Abramson, N. "The ALOHA SYSTEM—Another Alternative for Computer Communications," Fall JOINT COMPUTER CONFERENCE, AFIPS CONF. PROCEEDINGS, 1970, Vol. 37, pp. 281-285). This system uses a single radio channel which is shared by a plurality of stations spread throughout the Hawaiian Islands.

Whenever a station generates a packet in the ALOHA system, it transmits the packet on the common radio channel. Because it is possible that more than one station can generate, and attempt to transmit a packet simultaneously, several transmissions may occur which overlap. These overlapping or conflicting transmissions are said to collide if any portion of two packets overlap. The ALOHA system typically provides 18.3% channel utilization.

To reduce the effects of collision in the ALOHA System and increase channel utilization to 36.6%, Roberts (Roberts, L. G. "The ALOHA Packet System With and Without Slots and Capture," ARPA Network Information Center, Stanford Research Institute, Menlo Park Calif. ASS Note 8 (NIC 11290), June, 1972) made the suggestion that the channel be partitioned into slots of time equal to a packet length and that each station only transmit a packet at the beginning of a slot. In this way overlapping transmissions are forced to completely overlap. This simple suggestion or protocol as it is called, doubles the maximum utilization of the channel from that achieved using the unslotted ALOHA system and is called the slotted ALOHA protocol.

Carrier Sense Schemes

In 1971, as an improvement to the unslotted and slotted ALOHA schemes, D. Wax (Wax, D., University of Hawaii Internal Memorandum dated Mar. 9, 1971) suggested that any carrier signal on the communication channel be sensed by a station before it transmits a packet and that if a carrier is detected, that the transmission of the packet be deferred until the end of the carrier signal. This concept is well understood and has been used in voice aircraft radio communication. It is commonly called carrier sensing.

In 1974, Tobagi (Tobagi, F. A., "Random Access Techniques for Data Transmission Over Packet Switched Radio Networks, "Ph.D. Dissertation, December 1974, School of Engineering & Applied Science, University of California, Los Angeles, Calif. 90024) introduced and analyzed a class of channel access protocols using carrier sensing. Protocols typically define the rules for interaction between stations sharing a common communications channel. He showed that the use of carrier sensing as suggested by Wax could increase channel utilization to 86%.

Among the available protocols, two of the best understood protocols are the non-persistent and the one-persistent protocols. In these protocols, a station generates a packet and senses the channel to detect a carrier. If a carrier is not detected indicating the channel is not busy, the station begins transmission of the packet. If a carrier is detected, then depending on the protocol, action is taken to reschedule packet transmission. In a non-persistent Carrier Sense Multiple Access (CSMA) protocol, if a carrier is detected, the station chooses a random number and reschedules transmission at a later time specified by the random number. In the one-persistent CSMA protocol, if a carrier is detected by a station wishing to transmit, the station persists until the channel goes idle (i.e. a carrier is no longer detected) and then begins transmission. If the transmission is unsuccessful, then the station generates a random number and reschedules the transmission for a later time specified by the random number.

Collision Detection Schemes

In 1976 Metcalfe and Boggs (Metcalfe, R. M. and Boggs, D. R., "ETHERNET: Distributed Packet Switching for Local Computer Networks," CACM, Vol. 19 No. 7, p. 395, July 1976) introduced a one-persistent protocol with collision detection for multipoint packet data communication. Their idea, also disclosed in U.S. Pat. No. 4,063,220 filed on Mar. 31, 1975 and assigned to the Xerox Corporation, Stamford, Conn., was based on the assumption that a station in the act of transmission can detect transmissions from other stations and abort transmission if an overlap is detected.

Prior known systems of the collision detection type using a one-persistent protocol provide a channel utilization which reaches 97%. They exhibit, however, a number of disadvantages.

Principal disadvantages of the prior known one-persistent protocol system with collision detection are twofold: the collision detection mechanism employed and the protocol used to manage channel access.

The Collision Detection Mechanism

In a typical prior known one-persistent protocol system with collision detection, there is provided a plurality of transmitters each having an output which is coupled to a single or common communication channel by a transmit amplifier and to an exclusive OR gate by a delay element. The communication channel is also coupled to the exclusive OR gate by a receive amplifier.

In operation, when a transmission is in progress, the transmitted signal proceeds from the transmitter to the communication channel through the transmit amplifier and to one input of the exclusive OR gate through the delay element and from the communication channel through a receive amplifier to the other input of the exclusive OR gate. In a well-known manner, the exclusive OR gate provides an output only when its inputs are different.

The function of the delay element is to delay the transmit signal in accordance with the delays associated with the transmit amplifier, the receive amplifier and interconnecting signal carrying elements. If the delay element matches the delays of the transmit and receive amplifiers and the signal carrying elements, then the transmitted signal will arrive at both inputs to the exclusive OR gate at the same time. If this occurs, the output of the exclusive OR gate will not signal a collision. If however, a signal is present on the communication channel which destructively interferes with the transmitted signal thereon, the exclusive OR gate will detect a difference between the signal received directly from the transmitter through the delay element and the signal (or lack thereof) received from the communication channel and will indicate a collision.

Since the delay element cannot as a practical matter be made to accurately match the delays associated with the transmit amplifier, receive amplifier and interconnecting elements at all times under all normal operating conditions, differences in the signals presented to the inputs of the exclusive OR gate will often occur, causing spurious signals and hence potentially false indications of the presence of a collision to appear at the output of the exclusive OR gate.

In order to reduce the spurious signal, it has been the practise to couple a capacitor between ground and the exclusive OR gate. This has two important consequences. One is that the capacitor must be large enough to remove spurious signals generated by uncontrolled changes in the delay of the circuit elements, but not so large as to miss collisions caused by transmission overlap. The other consequence is that as the data rate is changed, the length of the channel is changed and other circuit changes are made to accommodate system requirement(s), the capacitor in all of the stations must also be changed.

The One-persistent Protocol Mechanism

The one-persistent protocol with channel control is provided to correct for instability. It works as follows. When a packet is generated by a station, the communication channel is sensed to determine if it is busy (BUSY). If it is not busy ($\overline{BUSY}$), then packet transmission begins. If it is BUSY, then the station persists at seeking access to the channel until the channel becomes not busy ($\overline{BUSY}$). When the channel becomes not busy, the transmitter then begins packet transmission. If, during the transmission, a collision is detected, the transmission is aborted, a random number is generated and the transmission is rescheduled to take place at a later time based on the magnitude of the random number.

A principal disadvantage of the one-persistent protocol is that it tends to break down under a load when there is a heavy demand for channel used by a plurality of stations. In order to minimize the number of breakdowns, a scheme based on counting collisions and generating a random number with a large mean based on the collisions counted is used. In apparatus using this control scheme, there is provided a means for counting collisions and a means responsive to the collisions counted in which, for each collision counted, the average rescheduling delay is increased. This serves to reduce the offered channel traffic on the channel and thus bring the entire system operation back to a region of higher channel utilization. However, the problems with this technique are that it requires special control hardware, that messages are delayed inordinately and that variation in this delay is very large.

SUMMARY OF THE INVENTION

In view of the foregoing, principal objects of the present invention are:

(a) A packet communication system employing a carrier sense multiple access protocol with collision detection.

(b) A system as described above with an improved means of collision detection.

(c) A system as described above with an improved means for managing access to a communication medium or channel.

In accordance with the above objects, there are provided a transceiver employing a novel means for collision detection and a channel access control means which, when used with a suitable collision detection means, exhibits superior performance and superior behavior under load. Both the collision detection and the channel access control means are particularly simple, leading to an improvement in function and reliability in comparison with prior known systems.

As will become apparent, the collision detection mechanism of the invention is insensitive to changes in the data rate and medium or channel length. It further does not require, as in prior known apparatus, the use of a delay element with its attendant problems. It will also become apparent that the channel access protocol, called non-persistent carrier sense with collision, is so well-behaved under severe load that no means for controlling the load on the channel is employed or required.

In addition to the novel collision detection and channel access control means of the present invention described above, systems employing the features described typically comprise mechanisms to perform carrier sense, NRZI encoding and decoding, send control, clock synchronization, random number generation control, random number generation, channel access delay for a time specified by the random number, and an interface to the communication medium.

Collision Detection

The collision detection apparatus of the present invention uses signal transitions to designate times to examine the state of the transmission medium or communication channel to assure that no transmission overlap occurs; or, if one occurs, to indicate that it has occurred. This mechanism utilizes the delay inherent in the traversal of a transmitted signal from a transmitter through a transmit amplifier to the communication channel and from the communication channel, through a receive amplifier and interconnecting elements coupling the transmitter, transmit and receive amplifiers, and communication channel.

In its operation, it uses a device responsive to transition to sample the level on the line at the output of the receive amplifier at the time of a transition at the output of the transmitter. As the output of the transmitter undergoes a transition from a binary zero to a binary one in the absence of a collision with other signals on the communication channel, the output of the receive amplifier should be a binary zero. A binary zero is present instead of a binary one because of the above described inherent circuit delay which delays the transmission of the signal from the transmitter to the output of the receive amplifier. Similarly, if in the absence of a collision the transmitter undergoes a transition from a binary one to a binary zero, the expected output of the receive amplifier should be, at that time, a binary one because of the inherent delay.

If in either case, the output of the receive amplifier is not the complement of the output of the transmitter immediately prior to a transition thereof, a collision is presumed and a collision detected signal is generated.

It will be appreciated that, because the sampling of the output of the receive amplifier is done within a fraction of the rise and fall time of a digital pulse, that the invention will perform as intended with inherent circuit delays approaching the rise and fall time of a digital pulse. Accordingly, as device technology provides devices having shorter and shorter response times, the devices may be used in systems embodying the present invention for detecting collisions in systems having very small inherent circuit delays.

Data Encoding and Bit Insertion

The data encoding scheme used assures that transitions appear sufficiently frequently to provide adequate opportunity for any collision to be detected and to ensure sufficient transitions on the transmission medium to avoid a direct current component therein. The particular coding chosen, one non-return and zero inversion, commonly called NRZI, provides a particularly simple encoding that complements the zero bit insertion techniques commonly used in packet framing techniques of protocols such as ADCCP, HDLC, SDLC.

The bit insertion technique commonly used in the above described packet framing techniques inserts a bit after every sequence of a predetermined number of the complement of that bit in the data portion of a message. In other than the data portion of a measage, sequences containing more than the predetermined number of the complement of the bit are used to provide start and end of packet indicators as well as provide other control functions. Accordingly, when a zero bit insertion technique is used, a zero is guaranteed to be in the data at least once in a predetermined number of bits in a sequence.

Of course, while it is also possible to construct a zero non-return one inverting code, NROI, which is complemented by a one bit insertion framing technique, in the embodiment described below, the NRZI encoding and decoding technique is used because of its compatibility with standard zero insertion framing techniques.

Carrier Sensing

In order to avoid collisions a means for detecting when the communication medium is in use is employed. This is often referred to as "carrier sensing". In a preferred embodiment the apparatus employed comprises a transition detector which presets a counter whenever a transition is seen on the communication medium. The counter thereafter counts at a rate equal to the data rate of transmission. As long as the count does not equal a predetermined number so that the counter continues to count, the communication medium is considered busy (BUSY) and an appropriate signal is generated. When the counter reaches a predetermined number, it is disabled, declaring the communication medium to be not busy ($\overline{BUSY}$) until such time as a transition presets and restarts the counter.

Clock Synchronization

In order to decode received data from the communication medium and provide a clock synchronized to the received data for use in packet reassembly in the receiver, a clock synchronization unit is used. The clock synchronizer uses a fast running clock which is a multiple of the clock used in data transmission to provide a time base from which the synchronization is drawn. This fast clock increments a counter that cycles once approximately each period of time equal to the clock rate of the transmitted data.

At each transition of the received data signal, the counter is set to a predetermined number. The presetting of the counter to the predetermined number and the subsequent output generated at a rate equal to the data rate synchronizes the clock to the received data.

Send Control

The send control mechanism manages data transmission by forming a signal responsive to the busy (BUSY) signal, the collision detect (CD) signal, and a request to send (RTS) signal. The request to send (RTS) signal indicates that a packet is ready to be transmitted and that channel access is allowed. The signal formed by the send control mechanism is called clear to send (CTS).

In the embodiment of the invention described, the clear to send (CTS) signal is generated only if the collision detected signal is absent, the busy signal is absent and the request to send signal is present. Once the clear to send signal is formed it remains even if the busy signal is later presented. The CTS signal is only removed if the request to send (RTS) signal is removed or the collision detected signal (CD) is presented or both.

Thus the mechanism acts to defer formation of a clear to send signal until the communication channel is not busy. However, once a clear to send (CTS) signal is formed, the channel will become busy (BUSY) (from transmission initiated by the clear to send (CTS) signal), If, however, a collision occurs, or the request to send (RTS) is withdrawn, then the clear to send (CTS) is also withdrawn.

Non Persistent Control

This mechanism is responsive to a request for access signal (RFA) from the transmitter, indicating that a packet is ready to transmit at the transmitter, if access to the channel is allowed. It is also responsive to the collision detect (CD) signal, the clear to send (CTS) signal and the busy (BUSY) signal. Its function is to form a generate random delay (GRD) signal. In the presence of a clear to send (CTS) signal and a collision detect (CD) signal and in the presence of the busy (BUSY) signal, the request for access (RFA) signal and the absence of a clear to send (CTS) signal, the generate random delay (GR) signal is formed. The mechanism checks the busy state of the channel when a request for access (RFA) is present and issues a generate random delay signal to generate a random delay if the channel is busy (BUSY). Also, if during transmission a collision occurs a generate random delay signal is generated.

Random Number Generator and Delay Mechanism

The function of the random number generator and delay mechanism is to generate delays of a geometrically distributed random amount of time. In the embodiment, a pseudo random number generator is used that generates over two billion numbers before repeating, although other means for generating random numbers may be used. Upon the occurrence of the generate random delay (GR) signal, a random number is generated. The random number generated is compared to a control parameter. If the random number is greater than or equal to the control parameter, a new random number is generated and the comparison is repeated. If the random number is less than the control parameter, then the generation of random numbers stops and the clear to access (CTA) signal is generated. This mechanism forms a delay that is geometrically distributed. The clear to access (CTA) signal is present until a new generate random delay (GR) signal is present.

Receiver and Bit Deletion

The receiver accepts the decoded data from the communication channel along with the data clock. It performs the bit deletion function of removing bits inserted by a transceiver and forms a packet for use by devices connected to the transceiver.

Transmitter

The transmitter accepts packets for transmission from devices using a transceiver. The transmitter presents a request for access (RFA) signal when it has a packet ready for transmission. Upon receiving a clear to send (CTS) signal, the transmitter commences transmission of the packet. If the clear to send (CTS) signal is removed prior to completion of packet transmission, the transmitter ceases transmission. The clear to send (CTS) signal is withdrawn if a collision occurs. Upon termination of transmission, either because the packet was completely transmitted or because the clear to send (CTS) signal was withdrawn, the transmitter withdraws the request for access (RFA) signal.

Channel Interface

The channel interface performs the function of coupling the transceiver to the communication medium. It also provides isolation between the communication medium and the transceiver to protect the transceiver from damaging signals.

BRIEF DESCRIPTION OF THE DRAWING

The above and other objects, features and advantages of the present invention will become apparent from the following detailed description of the accompanying drawing in which:

FIG. 2 is a block diagram of a send control circuit according to the present invention.

FIG. 3 is a block diagram of a single edge detection circuit according to the present invention.

FIG. 4 is signal diagram representing the operation of the circuit of FIG. 3.

FIG. 5 is a block diagram of a dual edge detector circuit according to the present invention.

FIG. 6 is a signal diagram representing the operation of the circuit of FIG. 5.

DETAILED DESCRIPTION OF THE DRAWING

Figure 1:
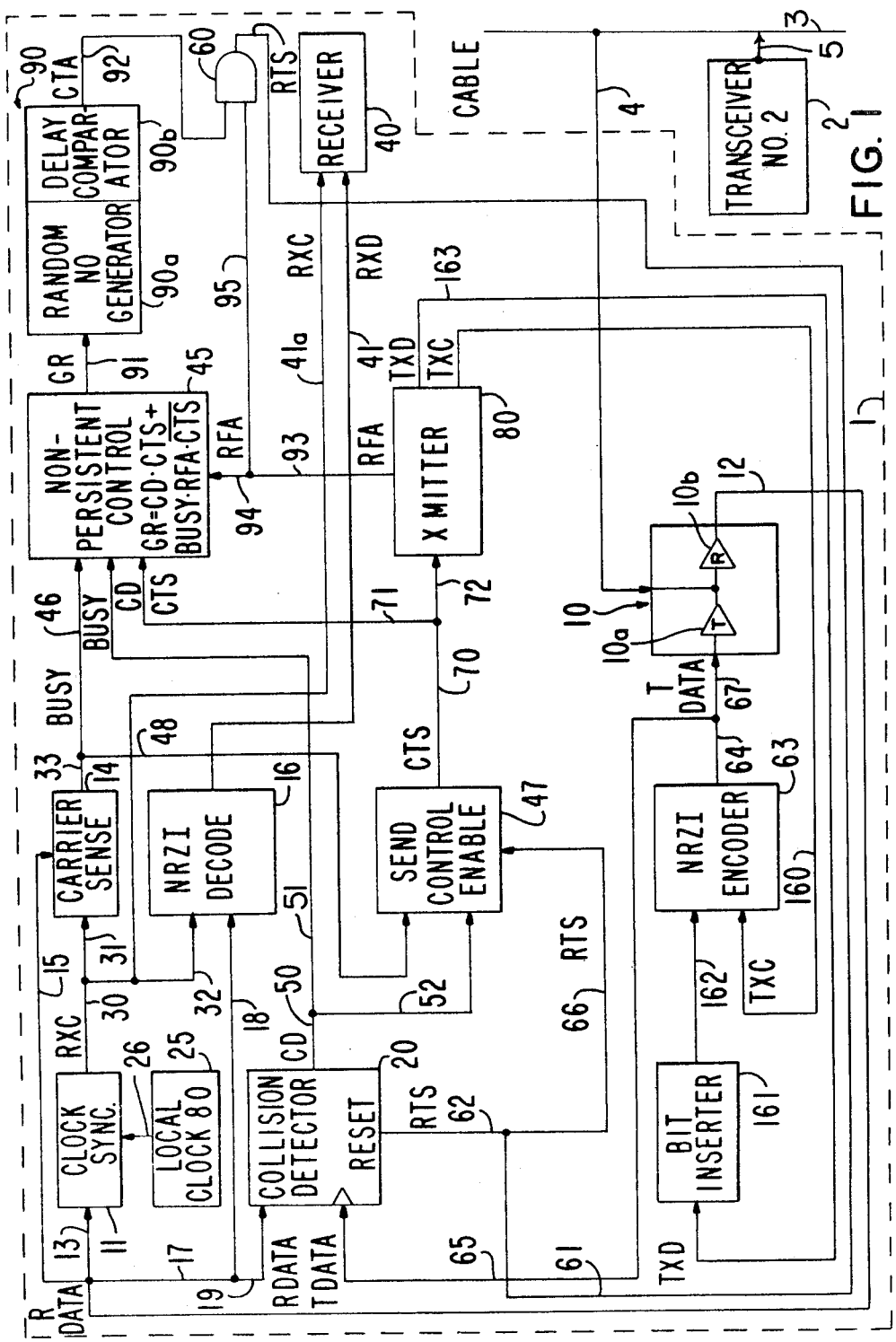
FIG. 1 is a block diagram of an embodiment of the present invention.

Referring to FIG. 1, there is provided in accordance with the present invention a plurality of transceivers designated generally as 1 and 2. Transceivers 1 and 2 are coupled to a common or single communication channel designated generally as 3 by means of a pair of electrical conductors 4 and 5. Typically the communication channel 3 comprises a coaxial cable but it is to be understood that other types of communication channels including optical fiber and radio frequency channels could be employed.

For purposes of describing the present invention, each of the transceivers 1 and 2 are considered to be substantially identical; however, it should be understood that different types of compatible receivers and transmitters could also be employed so long as suitable means are provided according to the present invention for their intercommunication. For this reason only transceiver 1 needs to be described in detail herein below.

In transceiver 1 there is provided a channel interface circuit 10. The channel interface circuit 10 couples the transceiver 1 to the cable 3 by means of the electrical conductor 4 and is coupled to a clock synchronizing circuit 11 by means of a line 12 and a line 13, to a carrier sense circuit 14 by means of the line 12 and a line 15, to an NRZI decoding circuit 16 by means of the line 12, a line 17 and a line 18, and to a collision detector circuit 20 by means of the lines 12 and 17 and a line 19. The lines 12, 13, 15, 17, 18 and 19 are all electrically conductive members, as are all the lines described herein.

In use they carry the data received by transceiver 1 from the cable 3 and are accordingly designated R DATA.

In the interface circuit 10, there is provided a transmit amplifier 10a and a receive amplifier 10b for amplifying the signals sent to (R DATA) transceiver 1 from the channel 3.

The clock synchronizing circuit 11 is coupled to a local clock circuit 25 by means of a line 26. The local clock circuit 25 provides on line 26 a "fast" clock signal which has a rate corresponding to a predetermined multiple of the rate of the data on the lines R DATA. For purposes of the disclosed embodiment of the present invention, the rate of the clock 25 is eight times the data rate.

In the clock synchronization circuit 11 there is provided an eight stage counter. The counter is advanced by the clock pulses from the local clock 25 for outputting a pulse designated RXC for every eight local clock input pulses. To synchronize the clock pulses RXC to the input data R DATA, the counter in the clock synchronization circuit 11 is reset each time a transition from a binary one to a binary zero or a binary zero to a binary one is received on the line 13. As will be described below, because of the NRZI packet format utilized and the use of bit insertion techniques in the data portion of a transmitted packet, a transition will appear on the R DATA line 13 at least once every eight bit times during packet reception.

The output of clock synchronization circuit 11 is coupled to the carrier sense circuit 14 by means of a line 30 and the line 31, and to the NRZI decoding circuit 16 by means of the line 30 and a line 32.

In the carrier sensing circuit 14 there is provided an eight stage counter which is advanced by the clock signal RXC of the clock synchronization circuit 11 and reset by a data pulse received on the R DATA line 15. An eight stage counter is used because of the format used in which a binary zero appears at least once in any sequence of eight bits.

In operation, so long as the counter in the carrier sense circuit 14 is being advanced by the clock signals RXC, the circuit 14 provides a busy (BUSY) signal on its output on a line 33. As soon as the counter overflows the output of the carrier sense circuit 14 changes to a not busy ($\overline{\text{BUSY}}$) signal. The $\overline{\text{BUSY}}$ signal disables the counter until another data pulse of the R DATA line 15 is received by the counter.

The NRZI decoding circuit 16 is provided for decoding NRZI formatted data received on the R DATA lines 12, 17 and 18. After the NRZI data is decoded in the decoding circuit 16, it is provided to a receiver 40 on a line 41 together with RXC clock signal 41a. Bit removal to remove bits inserted by a bit insertion circuit as described below may be incorporated in the circuit 16, or in the receiver 40.

The carrier sense circuit 14 is coupled to a non-persistent control circuit 45 by means of the line 33 and a line 46 and to a send control circuit 47 by means of the line 33 and a line 48.

The output of the collision detector circuit 20 comprising collision detected (CD) and no collision detected ($\overline{\text{CD}}$) signals is coupled to the non-persistent control circuit 45 by means of a line 50 and a line 51 and to the send control circuit 47 by means of the line 50 and a line 52.

The collision detector circuit 20 is also coupled to the output of an AND gate 60 by means of a line 61 and a line 62 for receiving a request to send (RTS) signal and a no request to send ($\overline{\text{RTS}}$) signal from the AND gate 60; and to the output of an NRZI encoder circuit 63 by means of a line 64 and a line 65 for receiving from the NRZI encoder circuit 63 transmitted data (T DATA).

The request to send signal (RTS) from the AND gate 60 is also coupled to the send control circuit 47 by means of the line 61 and line 66 for enabling the send control circuit 47.

Transmitted data (T DATA) from the NRZI encoder circuit 63 is also coupled to the channel interface circuit 10 by means of the line 64 and a line 67.

The send control circuit 47 is coupled to the non-persistent control circuit 45 by means of a line 70 and a line 71 and to a transmitter 80 by means of the line 70 and a line 72 for sending to the non-persistent control circuit 45 and the transmitter 80 a clear to send (CTS) signal and a not clear to send ($\overline{\text{CTS}}$) signal.

In the non-persistent control circuit 45 there are provided conventional AND and OR gates for generating a random delay (GR) signal in response to either a set of CD and CTS signals or a set of BUSY, RFA and CTS signals. The non-persistent control circuit 45 is coupled to a random number generator and delay circuit 90 comprising a random number generator 90a and a delay comparator circuit 90b by means of a line 91 for receiving from the non-persistent control circuit 45 the generate random delay (GR) signal.

In the random number generator and delay circuit 90 there is provided a pseudo random number generator of conventional design employing a predetermined number of bits of shift register, coupled through exclusive OR gates. At each advance of the clock a new random number is generated. The random number generated is compared to a control parameter in the delay comparator 90b. If the random number generated is greater than the control parameter then a new random number is generated and the comparison is redone. If the random number generated is less than the control parameter then the generation of random numbers stops and the clear to access signal (CTA) is generated. This mechanism generates a geometrically distributed delay time from the time the generate random delay (GR) signal is presented. The output of the random number generator and delay comparator circuit 90 is coupled to the AND gate 60 by means of a line 92 for providing to the AND gate 60 a clear to access (CTA) signal when the transceiver 1 is clear to access the channel 3 and a not clear to access ($\overline{\text{CTA}}$) signal when the transceiver 1 is not clear to access the channel 3.

The non-persistent control circuit 45 is coupled to the transmitter 80 by means of a line 93 and a line 94 for receiving from the transmitter 80 a request for access (RFA) signal. The AND gate 60 is coupled to the transmitter 80 by means of the line 93 and a line 95 for receiving from the transmitter 80 the request for access (RFA) signal.

Referring to FIG. 2, there is provided in a typical embodiment of the send control circuit 47 a pair of 74LS279 flipflops 100 and 101 and an AND gate 102. The request to send (RTS) signal is coupled by means of the line 66 and a line 103 to the complementary reset input of the flipflop 100, by means of the line 66 and a line 104 to the AND gate 102, and by means of the line 66 and a line 105 to the complementary set input of the flipflop 101. The BUSY and $\overline{\text{BUSY}}$ signals from the carrier sense circuit 14 are coupled to the complementary set input of the flipflop 100 by means of the line 48. The Q output of the flipflop 100 is coupled to the AND gate 102 by means of a line 106. The signals CD and $\overline{\text{CD}}$ from the collision detector circuit 20 are coupled to the complementary reset input of the flipflop 101 by means of the line 52. The Q output of the flipflop 101 is coupled to the AND gate 102 by means of a line 107. The line 70 is coupled to the output of the AND gate 102 for providing the clear to send (CTS) and not clear to send ($\overline{\text{CTS}}$) signals on the line 70.

Referring to FIG. 3, there is provided in a typical embodiment of the collision detector circuit 20 a single edge detection circuit comprising a D-flipflop 110. The T DATA signal from the NRZI encoder circuit 73 is coupled to the negative going edge trigger input of the flipflop 110. The receive data (R DATA) from the channel interface circuit 10 is coupled to the D INPUT of the flipflop 110 by means of the line 19. The request to send (RTS) signal from the AND circuit 60 is coupled to the complementary set input of the flipflop 110 by by means of the line 62. The complementary output $\bar{Q}$ of the flipflop 110 provides the collision detect (CD) and no collision detected ($\overline{CD}$) signals on the line 50.

Referring to FIG. 4, there is represented the operation of the circuit of FIG. 3 during a combination of signals giving rise to a no-collision condition and to a combination of signals giving rise to a collision condition. In FIG. 4 there are shown two transmitted data (T DATA) pulses 120 and 121 and two receive data (R DATA) pulses 122 and 123. The delay of the receive data pulses 122 and 123 from the transmitted data pulses 120 and 121 is due to the inherent delay in the signal path leading from the output of the NRZI encoder 63 through the channel interface circuit 10 to the receive data input on the line 10 at the collision detector circuit 20. The R DATA pulse 123 is foreshortened from its expected duration shown in broken lines because of an assumed destructive interference with another signal on the channel 3.

Because of the inherent circuit delay, in the absence of any other destructively interfacing signal on channel 3 detrimentally affecting the received data signal on the line 19 of the D-flipflop 110, it is expected that the receive data signal will be present on the line 10 at the time that the negative going edge of the transmitted data pulse from the NRZI encoder circuit 63 appears on the line 65. If this occurs as expected, the output of the D-flipflop 110 will indicate that no collision exists by placing on the line 50 a $\overline{CD}$ signal. On the other hand, if due to the transmission of another transceiver coupled to the cable 3 or noise or the like appearing on the cable 3, the expected receive data signal does not appear on the line 19 at the time of receipt of the negative going edge of the transmitted data signal on the line 65 as represented by T DATA pulse 121 and R DATA pulse 123, the D-flipflop 110 will change state and a collision will be indicated and a CD signal provided on the line 50.

Referring to FIG. 5, there is provided in another embodiment of the present invention a dual edge detection circuit comprising a pair of D-flipflops 130 and 131. The circuit of FIG. 5 may be used in place of the circuit of FIG. 2 for detecting the presence or absence of a collision using both the positive going and negative going edges of the transmitted data pulses for sampling the state of the flipflops 130 and 131. The flipflop 130, like the flipflop 110 of FIG. 3 operates on the negative going edges of the transmitted data while the flipflop 131 operates on the positive going edges of the transmitted data.

The transmitted data on the line 65 is coupled to the negative going trigger input of the flipflop 130 by means of a line 132 and the positive going trigger input of the flipflop 131 by means of a line 133. The receive data on the line 19 is coupled to the D INPUT of the flipflop 130 by means of a line 134 and to the D INPUT of the flipflop 131 by means of a line 135. The RTS signal on the line 62 is coupled to the complementary set input of the flipflop 130 by means of a line 136 and to the complementary reset input of the flipflop 131 by means of a line 137. The $\bar{Q}$ output of the flipflop 130 is coupled to an OR gate 138 by means of a line 139. The Q output of the flipflop 131 is coupled to the OR gate 138 by means of a line 140. The output of the OR gate 138 provides the CD output signal on the line 50.

Referring to FIG. 6, there are shown three transmitted data (T DATA) pulses 145, 146 and 147 and three receive data (R DATA) pulses 148, 149 and 150. The R DATA pulse 148 is delayed by a normal and expected amount from the transmitted data pulse 145 due to the inherent delay in the signal path leading from the output of the NRZI encoder to the R DATA line 19 coupled to the D INPUT of the flipflops 130 and 131. The R DATA pulse 149 represents a receive data pulse which has been similarly delayed but which has also been foreshortened by a colliding transmission, noise signal or the like appearing on the cable 3. The R DATA pulse 150 shown leading the transmitted data pulse 147 is assumed to be due to a malfunction in the circuit, a noise pulse or the like.

In operation, with an RTS signal on the line 62, the flipflops 130 and 131 are conditioned for detecting a collision. Referring to pulses 145 and 146 of FIG. 6, under normal conditions and in the absence of a collision, the R DATA pulse 148 will be present on the line 19 at the time the trailing edge of a transmitted data pulse 145 appears on the line 65 but will not be present at the time the leading edge of the transmitted data pulse 145 is present on the line 65. Under those conditions, neither the flipflop 130 or the flipflop 131 will change state, leaving the output of the OR gate 138 unchanged and indicating a no-collision detected signal or a $\overline{CD}$ signal.

Referring to transmitted data pulse 146 and receive data pulse 149 of FIG. 6, the absence of a received data pulse upon the positive going edge of the transmitted data pulse 146 will not change the state of the flipflop 131; however, the absence of a receive data pulse at the time of receipt of the negative going edge of the transmitted data pulse 146 will change the state of the flipflop 130, causing a collision detected signal (CD) on the line 50.

Referring to the transmitted data pulses 147 and the receive data pulse 150, the presence of a receive data pulse 150 on the line 19 at the time of receipt of a positive going edge of the transmitted data pulse 147 will result in a change of state of the flipflop 131 providing a collision detected signal (CD) on the line 50 and similarly, the absence of the received data pulse 150 at the time of receipt of the negative going edge of the transmitted data pulse 147 on the line 65 will cause the flipflop 130 to also change state, also causing a collision detected signal (CD) on the output on the line 50 at the output of the OR gate 138.

As will be apparent from the following description of the operation of the system, either the single edge detection circuit of FIG. 3 or the dual edge detection circuit of FIG. 5 may be used, and in fact, the use of the dual edge detection circuit of FIG. 5 provides certain advantages of redundancy which may be desirable in certain applications.

In describing the operation of the system, it is assumed that a plurality of transceivers are coupled to the cable 3, that all of the transceivers are free to request access to the channel 3 and, if given access, to transmit information to another transceiver using the cable 3 independently and at random times depending upon the presence or absence of collisions between messages placed on the cable 3.

It is also assumed that a message, also called a packet, comprises a leading flag, followed by a multi bit address, a data message of a predetermined length, error control data, and a trailing flag identical to the leading flag; and that when transmitting, the transmitter 80 transmits a data packet (TXD) on a line 160 coupled to a bit inserter circuit 161 which is, in turn coupled to the NRZI encoder 63 by means of a line 162. A transmitted clock signal (TXC) is also sent to the NRZI encoder 63 from the transmitter 80 by means of a line 163 for encoding the TXD data.

In operation, when a transceiver requests access to the channel 3, a request for access (RFA) signal is placed on the line 93 and appears on the input line 94 to the non-persistent control circuit 45 and the AND gate 60. At that time, since the transmitter 80 has not yet transmitted a signal, the signal on the line 51 coupling the collision detector 20 and the non-persistent control circuit 45 will be $\overline{CD}$ and the signal on the line 71 will be $\overline{CTS}$. Assuming no other transceiver is using channel 3, the signal on line 46 will be $\overline{BUSY}$. With a $\overline{BUSY}$, $\overline{CTS}$ and an RFA signal on the input of the non-persistent control circuit 45, the output of the non-persistent control circuit 45 on the line 91 will be $\overline{GR}$. With $\overline{GR}$ on the line 91, the random number generator and delay circuit 90 will provide a clear to access (CTA) signal on the line 92 to the AND gate 60. With a CTA and an RFA signal at the inputs to the AND gate signal, an RTS signal is generated at the output of the AND gate 60 and applied to the collision detector circuit 20 and the send control enable circuit 47.

Since under the assumed initial conditions the transmitter 80 has not yet transmitted a signal, the output of the collision detector circuit 20 on the lines 50, 51 and 52 is $\overline{CD}$, indicating that no collision has been detected. Similarly, with the initial assumption that no other transceiver is using the cable 3 and no noise pulse is present on the cable 3, the carrier sense circuit 14 provides a $\overline{BUSY}$ signal on the lines 33, 46 and 48. With a $\overline{BUSY}$ signal on the line 48 and a $\overline{CD}$ signal on the line 52, the output of the send control circuit 47 comprises a clear to send signal (CTS) on the lines 70, 71 and 72. A CTS signal on the line 70 is coupled to the transmitter 80 by means of the line 72. When the transmitter 80 receives the CTS signal, it transmits the packet and a clock signal on the lines 163 and 160 respectively. As the packet is received from the transmitter 80 by the bit inserter 161, the bit inserter 161 inserts a zero in the data portion of the packet after every sequence of five binary ones and transmits the packet thus modified on the line 162 to the NRZI encoder 164 for NRZI encoding. Alternatively, the bit inserter 161 could be made to insert a binary one after a predetermined number of binary zeros in a sequence in the data and in that event, instead of NRZI encoding, encoder 63 would be modified to employ an NROI encoding.

From the NRZI encoder 63, the encoded packet is transmitted to the cable 3 by means of the channel interface circuit 10 and the line 4 and to the edge trigger input of the collision detector circuit 20 by means of the line 65. After a time delay determined by the inherent delay of the channel interface circuit 10, including the transmit and receive amplifiers 10a and 10b the lines 12, 17 and 19, the modified packet is received as R DATA on the line 19 by the collision detector circuit 20. As described above, in the absence of a collision with a packet from another transceiver, noise or the like on the cable 3, the received data pulse on the line 19 will be sampled at the time of receipt of either or both the negative going edge or the positive going edge of the transmitted data pulse and will provide a $\overline{CD}$ on the line 50. Whether or not both edges are used depends on whether the single or the dual edge detection circuits described above with respect to FIGS. 3–6 are used.

At the same time that the modified packet is received on the line 19 by the collision detector circuit 20, the packet is also received by the clock synchronizing circuit 11, the carrier sense circuit 14 and the NRZI decoding circuit 16.

In the clock synchronizing circuit 11 the eight stage counter is reset upon transitions in the packet. Since the bit inserter 161 inserts a zero bit after any sequence of five bits in the data portion of the packet and the flag portion of the packets comprises eight bits, beginning and ending with a binary zero, at no time does a packet exceed eight bits before a binary zero is detected. Accordingly, the counter in the clock synchronization circuit 11 is reset at least once every eight bits during the receipt of a packet. Since the clock synchronization circuit 11 is reset at least once every eight bits during the receipt of a packet, its output, clock signal RXC, is similarly resynchronized with the bit times of a packet at least once within every eight bit times.

The eight stage counter in the carrier sense circuit 14 which is advanced by the synchronized signal RXC on the line 31 is reset upon receipt of transitions on the line 15. If the counter in the carrier sense circuit 14 overflows before being reset, a $\overline{BUSY}$ signal is generated on the line 33. Accordingly, so long as the carrier sense circuit 14 is reset before it overflows, a BUSY signal, indicating the presence of a packet on the line 15 will appear on the line 33.

The packet received on the line 18 coupled to the NRZI decoding circuit 16 is decoded by the circuit 16 using the synchronized clock signal RXC on the line 32. The decoded information appearing on the line 41 corresponding to the information transmitted by the transmitter 80 serves as a check of the information transmitted by the transmitter 80.

Since the output of the send control enable circuit 74 is not affected by the presence of a BUSY signal on the lines 33 and 48 so long as an RTS signal is present on the line 66, the send control circuit 47 will not change state and will continue to output a CTS signal on the line 70 until such time as there occurs a collision between a packet being transmitted by the transmitter 80 and another packet from another transceiver or noise on the channel 3.

In the event that another transceiver attempts to transmit a packet on the cable 3 while the transmitter 80 is transmitting a packet on the cable 3 or the transmitter 80 attempts to transmit a packet on the cable 3 while another transceiver is transmitting a packet on the cable 3 or a noise pulse or the like alters the expected state of the cable 3 at the time that the leading or trailing edges of a transmitted data pulse is received by the collision detector 20, a collision detected signal (CD) will be generated by the collision detector 20 on the line 50.

When a collision detected signal (CD) is generated on the line 50, it is received by the send control circuit 47 on the line 52. The presence of a CD signal on line 52 changes the state of the send control circuit 47 and its output on the line 70 from a clear to send (CTS) signal to a not clear to send ($\overline{CTS}$) signal.

The presence of a $\overline{CTS}$ signal on the line 70 is received by the transmitter 80 on the line 72 and terminates transmission by the transmitter 80.

At the same time the receipt of the CD signal on the line 51 and the CTS on the line 71 by the non-persistent control circuit 45 causes the non-persistent control circuit 45 to generate a generate random delay (GR) signal on the line 91. The receipt of the GR signal by the random number generator and delay circuit 90 causes a geometrically distributed random delay to be generated. In response to the expectation of the random delay the $\overline{\text{CTA}}$ signal is generated.

In summary, the receiver 40 will receive packets from the cable 3 through the NRZI decoding circuits 16 using the clock synchronizing circuit 11 and the local clock circuit 25. When it is desired to transmit a packet using the cable 3 to another transceiver, a request for access (RFA) signal is generated. If no other signal is on the cable 3, at the time that the RFA signal is generated, the carrier sense circuit 14 will present a $\overline{\text{BUSY}}$ signal and the send control enable circuit 47 will be outputting a CTS signal permitting the transmitter 80 to transmit the packet to the cable 3 through the bit inserter 161, the NRZI encoder circuit 63 and the channel interface circuit 10.

If on the other hand, at the time that the RFA signal is generated by the transmitter 80 another transceiver is transmitting a message on the cable 3, a BUSY signal will be generated by the carrier sense circuit 14. With a BUSY signal generated by the carrier sense circuit 14, the non-persistent control circuit 45 and the random number generator and delay circuit 90 will delay the generating of a clear to access (CTA) signal on the line 92, thereby delaying the transmission of the packet by the transmitter 80 for a length of time determined by the random number generator and delay circuit 90.

If after transmitter 80 begins transmitting a packet on the cable 3, another transceiver begins generating a packet on the cable 3 or a noise pulse occurs on the cable 3 causing destructive interference with the signals from the transmitter 80, the collision detector 20 using either the leading or trailing edges of the transmitted data pulse on the line 65 or both, depending upon whether a single or dual edge detector is used as described above with respect to FIGS. 3-6, will generate a collision detected (CD) signal on the lines 50, 51 and 52. The presence of a CD signal on the line 51 will be received by the non-persistent control circuit 45 causing the random number generator 90 and delay circuit 90 to interrupt and delay the transmission by the transmitter 80 for a period of time corresponding to a random number generated by the random number generator and delay circuit 90.

Figure 7:
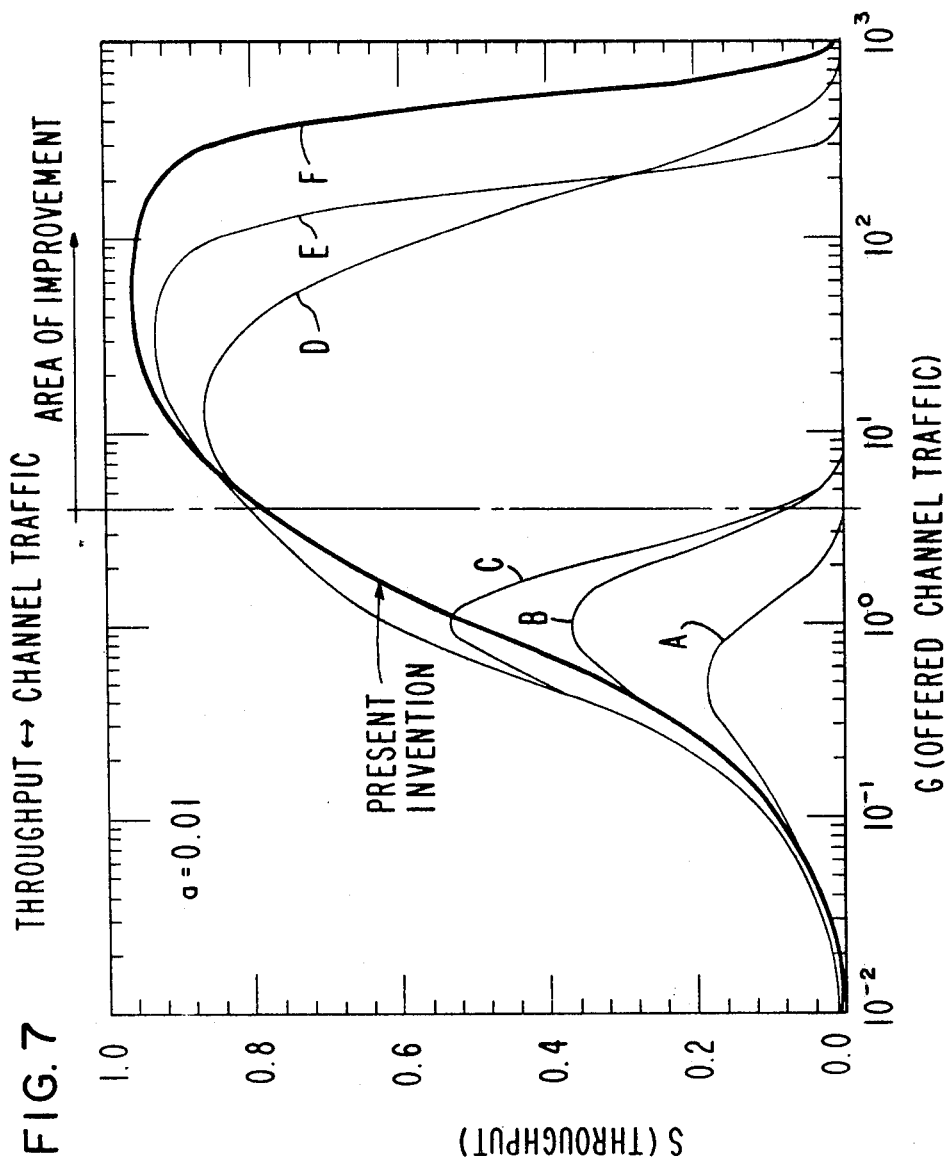
FIG. 7 is a normalized diagram of the throughput versus channel traffic of an embodiment of the present invention and prior-known related systems.

Referring to FIG. 7, the channel utilization of several protocols is illustrated as a function of the rate at which the channel is checked to determine whether it is available for accepting a transmission. The rate of checking of the channel increases with increasing generation of packets. This rate is called "offered channel traffic."

In FIG. 7, curve A represents the operation of a pure ALOHA system as described by Abramson. Curve B represents the operation of a slotted ALOHA system as described by Roberts. Curve C represents the operation of a one-persistent carrier sense multiple access system as described by Tobagi. Curve D represents the operation of a non-persistent carrier sense multiple access system. Curve E represents the operation of a one-persistent carrier sense multiple access collision detection system as described by Metcalfe and Boggs without channel control. Curve F represents the operation of a non-persistent carrier sense multiple access collision detection system according to the present invention.

Two important features of the curves are the maximum channel utilization attainable from each protocol and the channel utilization which can be obtained with increasing offered channel traffic. It is clear that the present invention's non-persistent CSMA/CD protocol (Curve F) is superior in channel utilization to all previous protocols and that its channel utilization remains high over a wider range than previous protocols.

From FIG. 7, it is clear that the present invention embodies a protocol that offers improved channel utilization and, more importantly, significantly improved stability with no control. As can be seen in FIG. 7 comparing the two protocols under identical conditions, the new protocol offers higher channel utilization over a range of 4-500 times the rate that the channel can carry before breaking down. In practical terms, the protocol is sufficiently stable to not require implementation of any control scheme.

While an embodiment of the present invention and a number of modifications thereto have been suggested, it is contemplated that still other modifications may be made to the embodiments disclosed without departing from the spirit and the scope of the present invention. For example, it is contemplated that for reasons of economy and availability, various types of integrated circuits may be used which will require the use of various types of other circuits not disclosed to provide the necessary control and data signal levels for their operation, all of which is within the skill of the art. Accordingly, for the foregoing reasons it is intended that the scope of the invention not be limited to the embodiment disclosed but be determined by reference to the claims hereinafter provided and their equivalents.

What is claimed is:

1. In a data communication system having a communication channel for interconnecting a plurality of transceivers, each of said transceivers including means for transmitting a signal having transitions, the improvement comprising:
   means responsive to the presence and absence of a signal on said communication channel during a transition of a signal transmitted by said transmitting means for providing a collision detected (CD) signal if no signal is detected on said communication channel during a transition of said transmitted signal; and
   means responsive to said CD signal for terminating said transmitting of said signal.

2. The improvement according to claim 1 comprising means for checking said channel for the presence of a signal; and
   means responsive to said checking means for providing a channel is not busy ($\overline{\text{BUSY}}$) signal when the presence of a signal is not detectable and a channel is busy (BUSY) signal when the presence of a signal is detected.

3. The improvement according to claim 2 comprising means for providing a request to send (RTS) signal and a request not to send ($\overline{\text{RTS}}$) signal;
   means responsive to said RTS and said $\overline{\text{BUSY}}$ signals for providing a clear to send (CTS) signal.

4. The improvement according to claim 3 wherein said signal transmitting terminating means comprises means responsive to said CD signal for terminating said CTS signal and providing a not clear to send ($\overline{\text{CTS}}$) signal.

5. The improvement according to claim 1 comprising:
means for providing a clock (LCK) signal having a rate equal to a predetermined multiple of the rate of a transmitted signal received on said channel from a transceiver; and
means responsive to said transmitted signal and said LCK signal for providing a clock (RXC) signal having a rate equal to the rate of said transmitted signal and synchronized therewith.

6. The improvement according to claim 5 comprising:
means responsive to said RXC signal and a transmitted signal received from said communication channel for decoding said transmitted signal and providing a decoded data signal (RXD) corresponding thereto.

7. The improvement according to claim 6 wherein said transmitted signals are non-return zero inverting (NRZI) encoded or non-return one inverting (NROI) encoded and said decoding means comprises means for decoding said transmitted signals.

8. The improvement according to claim 1 comprising means responsive to said transmitting means for encoding said transmitted signal.

9. The improvement according to claim 8 wherein said encoding means comprises means for NRZI or NROI encoding said transmitted signal.

10. The improvement according to claim 8 wherein said transmitted signal comprises a data portion and comprising means coupled between said transmitting means and an input of said encoding means for inserting a binary bit in said data portion of said transmitted signal after every sequence of a predetermined number of the complement of said bit.

11. The improvement according to claim 4 comprising means for providing a request for access (RFA) signal and wherein said RTS signal providing means comprises:
means responsive to said CD signal and said $\overline{\text{CTS}}$ signal or said BUSY, said RFA and said CTS signals for providing a generate random delay (GR) signal;
means responsive to said GR signal for generating a clear-to-access (CTA) signal at a random time after receipt of said GR signal; and
means responsive to said RFA and said CTA signals for providing said RTS signal.

12. In a data communication system having a communication channel for interconnecting a plurality of transceivers, each of said transceivers including means for transmitting a signal and first means associated with each of said transceivers for detecting when a plurality of said transceivers is transmitting a signal on said channel simultaneously, the improvement comprising:
second means for detecting when said channel is busy prior to a transmission by each of said transceivers; and
means responsive to said first and second detecting means for interrupting and delaying said transmitting of each of said transceivers for a geometrically distributed random period of time.

13. In a data communication system having a communication channel for interconnecting a plurality of transceivers, each of said transceivers comprising:
means for transmitting a signal;
first means for receiving a signal on said communication channel from another of said plurality of transceivers and said transmitting means;
means responsive to said first receiving means for providing a busy (BUSY) signal when a signal from any one of said transceivers is received on said communication channel and a not busy ($\overline{\text{BUSY}}$) signal when no signal is received on said communication channel from any one of said transceivers;
second means for receiving a signal transmitted to said communication channel by said transceiver;
means responsive to said first and said second receiving means for providing a collision detected (CD) signal when said transmitted signal makes a transition and a signal received by said first means during said transition has a signal value which differs substantially from the value from which said transmitted signal transitioned;
means for providing a request for access (RFA) signal;
means responsive to said RFA and a clear-to-access (CTA) signal for providing a request to send (RTS) signal;
means responsive to said RTS and $\overline{\text{BUSY}}$ signals for providing a clear to send ($\overline{\text{CTS}}$) signal;
means responsive to said CD signal for terminating said CTS signal and providing a not clear-to-send (CTS) signal;
means responsive to said CD and CTS signals or said BUSY, RFA and $\overline{\text{CTS}}$ signals for providing a generate random delay (GR) signal; and
means responsive to said GR signal for generating said clear-to-access (CTA) signal at a random time after receipt of said GR signal.

* * * * *